US005349534A

United States Patent [19]

Rousseff et al.

[11] Patent Number: 5,349,534

[45] Date of Patent: Sep. 20, 1994

[54] AUTOMATIC FORM DISPENSING SYSTEM

[75] Inventors: Christ M. Rousseff, Rancho Santa Fe, Calif.; George E. Wallace, Salem, Ohio

[73] Assignee: American Registration Systems, Inc., Encinitas, Calif.

[21] Appl. No.: 119,406

[22] Filed: Sep. 9, 1993

[51] Int. Cl.[5] .................... G06F 15/00; G06F 7/08

[52] U.S. Cl. .................... 364/479; 235/381; 902/18; 902/21

[58] Field of Search .................... 364/479, 478, 468, 464.01–464.03, 364/471, 404, 409; 235/381–383, 379; 902/18, 30, 21–23, 41; 221/9, 15, 73

[56] References Cited

U.S. PATENT DOCUMENTS

| | | | |
|---|---|---|---|
| 4,449,186 | 5/1984 | Kelly et al. | 364/401 |
| 4,567,359 | 1/1986 | Lockwood | 235/381 |
| 4,970,655 | 11/1990 | Winn et al. | 364/479 |
| 4,982,337 | 1/1991 | Burr et al. | 364/479 |
| 5,029,099 | 7/1991 | Goodman | 364/479 |
| 5,036,472 | 7/1991 | Buckley et al. | 364/479 |
| 5,038,293 | 8/1991 | Goodman | 364/479 |
| 5,142,482 | 8/1992 | Sansone | 364/478 |
| 5,154,246 | 10/1992 | DiGiulio et al. | 364/464.03 |
| 5,207,349 | 5/1993 | Kringel | 221/15 |
| 5,209,374 | 5/1993 | Seidl-Lichhardt | 221/73 |
| 5,243,174 | 9/1993 | Veeneman et al. | 235/381 |
| 5,249,044 | 9/1993 | Von Kohorn | 364/401 |

*Primary Examiner*—Jerry Smith
*Assistant Examiner*—Jim Trammell
*Attorney, Agent, or Firm*—Michael Sand Co.

[57] ABSTRACT

An automatic form dispensing system for a variety of transactions has a housing with an operator interface for receiving operator input, and has a form dispensing assembly in the housing and a roll of blank form stock and two rolls of a carrier web containing blank stickers retained thereon by a pressure sensitive adhesive. At least one of the stickers is removed automatically from the carrier web and applied to the blank form stock as the blank form stock moves towards a dispense slot of the housing. A printer thermally prints information on the sticker and on a portion of the blank form stock adjacent the applied sticker in response to the operator input. A cutter cuts the printed potion of the form stock which contains the applied sticker from the roll of blank form stock to provide a completed printed form. A dispensing device then dispenses the printed form from the housing through a dispense slot. A fee indicating and receiving assembly may be incorporated in the housing for receiving fee payment and then actuating the dispenser assembly.

20 Claims, 4 Drawing Sheets

AUTOMATIC FORM DISPENSING SYSTEM

BACKGROUND OF THE INVENTION

1. Technical Field

The invention relates to a system for automatically dispensing forms from a terminal or housing, such as government forms for automobile registrations, drivers license extensions, hunting and fishing licenses, etc. More particularly, the invention relates to such a system in which the housing contains entirely blank forms, and labels, decals, stickers, hereinafter referred to as stickers, on which the necessary information is subsequently printed depending upon the particular transaction, to eliminate the storage of potentially important forms containing confidential and delicate information, which heretofore was subject to fraud and theft, such as vehicle registration serial numbers, etc.

2. Background Information

Various devices have been developed for the dispensing of forms previously handled in labor intensive government offices, by installation of such devices both at the Government office or at a remote location. Various automatic machines have been proposed and used in the past in various fields particularly banking, postage stamp vending, video tape vending and airline ticket vending. These generally involve sales of articles or money dispensing, or the dispensing of ticket information by an operator hired by a company or government located at the site of the dispenser.

These housings or terminals whether they are located on site or at a remote site, are usually connected to a remote database containing various information pertaining to the particular uses to which the terminal is intended. Examples of such dispensing systems are shown and described in detail in U.S. Pat. Nos. 4,567,359 and 4,970,655.

One problem with such systems, and in particular of the type described in U.S. Pat. No. 4,970,655 is that when used for the dispensing of Government forms such as vehicle registrations, license renewals, etc., it requires that the terminal or housing contain the required forms having preprinted information thereon, and most importantly contain stickers having license identification numbers already printed thereon for subsequent application to the preprinted form. These numbered stickers are quite valuable and can be used by car theft rings to validate vehicle titles and licenses of stolen vehicles. This lends the dispensing system to both theft and fraud on behalf of third parties, as well as by employees of the government and/or company which operates and services the form dispenser.

Thus, the need exists for an improved form dispensing system which will dispense various types of forms, such as vehicle and license registration forms, hunting and fishing licenses, etc., wherein all of the forms within the machine are blank thereby avoiding theft and fraud.

SUMMARY OF THE INVENTION

Objectives of the invention include providing an improved automatic form dispensing system and device which includes an attended or unattended terminal capable of dispensing appropriate forms from entirely blank forms contained within the housing.

Another objective of the invention is to provide such a system which may be incorporated into an unattended machine or system that is capable of collecting fees and dispensing the appropriate printed forms based upon information supplied by the operator of the machine in cooperation with a remote database.

A still further objective of the invention is to provide such a dispensing system which is provided with an operator interface on the outside of the housing which may include a display unit for displaying information instructions to the operator, a control device for allowing the operator to enter commands and information and for certain applications, especially when used as a remote terminal, containing fee collection devices.

A still further objective of the invention is to provide such a form dispensing system in which the housing includes at least two and preferably three supplies of blank stock, one of which is a roll of blank paper stock and the other two being rolls of a carrier web having a plurality of stickers attached thereto by a pressure-sensitive adhesive for subsequent transfer onto the blank paper stock.

Still another objective of the invention is to provide such a dispensing system which includes a printer for printing information on the blank paper stock and on the stickers, which printer transfers the information by thermal application, which enables the printed information to be retained on the stickers, which when used for license registration identification purposes, is formed of a reflective material having a specifically coated surface which is difficult to retain printed material thereon when applied by usual impact printers.

A further objective is to provide such a system in which a control unit in the housing controls operation of the dispensing system and display unit and which can receive information and commands entered by the operator, and for certain applications detect fee payment. The control unit also connects to an interface unit for linking the control system to a remote computer containing stored information for various transactions and types of forms to be printed thereon, and also can connect to various databases containing information specific to a particular transaction to be subsequently printed on the blank paper and/or sticker stock, particular to an individual customer or operator of the system.

Furthermore, in accordance with the preferred embodiment of the invention, the system is designed for use for dispensing automobile registrations and drivers license extensions, and is intended to be controlled by a government employee, although it can be incorporated into a remote control terminal, wherein one or two stickers formed of a specialized reflective material is applied to blank paper stock, afterwhich all the necessary printing and identification numbers are printed thereon, afterwhich a cutting apparatus is actuated to cut a predetermined length from the roll of paper or tag stock, which length contains the printed information and the "real time" printed stickers, for subsequent dispensing to the operator and/or customer of the terminal. The newly printed stickers are adhesively secured to the newly printed form by a release adhesive for subsequent removal by the customer and placement on his/her license plate, with the printed portion of the form being retained by the customer as the identification for the license and/or vehicle.

Another objective of the invention is to provide such a system which can be easily arranged to receive information for subsequent printing on the blank paper stock to automatically issue fishing and hunting licenses, various government permits, and by altering the database and control means for controlling the printer, may also print the form with various graphics contained in the database.

These objectives and advantages are obtained by the improved automatic form and sticker printing system of the invention, the general nature of which may be stated as including entry means for allowing an operator entry of commands and information; at least two form supply means in the housing for providing a supply of blank forms, each having first and second sides, for receiving information specific to a particular transaction on the first side, and with one of said blank stock supplies having a pressure-sensitive adhesive on the second side thereof; application means for releasably applying at least one of the pressure-sensitive blank stickers onto another of the blank forms to form a combined form; printer means for printing information on the first sides of both the blank form and blank stickers; transport means for transporting the blank form and stickers from the supply means to the printer means; dispensing means for dispensing the printed combined forms from the housing to an operator; and control means for controlling operation of the entry means, transport means and dispensing means according to a stored program instructions.

These objectives and advantages are further obtained by the improved method of the invention, the general nature of which may be stated as including a method for dispensing forms to operators of a terminal including the steps of providing a roll of blank form stock material within the terminal; providing a first roll of a carrier web containing a plurality of blank stickers releasably adhered to the web by an adhesive; collecting all information required from an operator for a specific transaction; communicating with a database containing stored information concerning the specific transaction; controlling a form dispensing assembly in response to information collected from an operator including removing at least one of the stickers from the carrier web and applying it on the blank form stock; printing information specific to the specific transaction on a portion of the blank form stock and on said blank sticker; cutting off a length of said blank form stock containing the printed information and applied sticker from the roll of blank stock to provide the desired printed form; and dispensing the printed form from the terminal.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
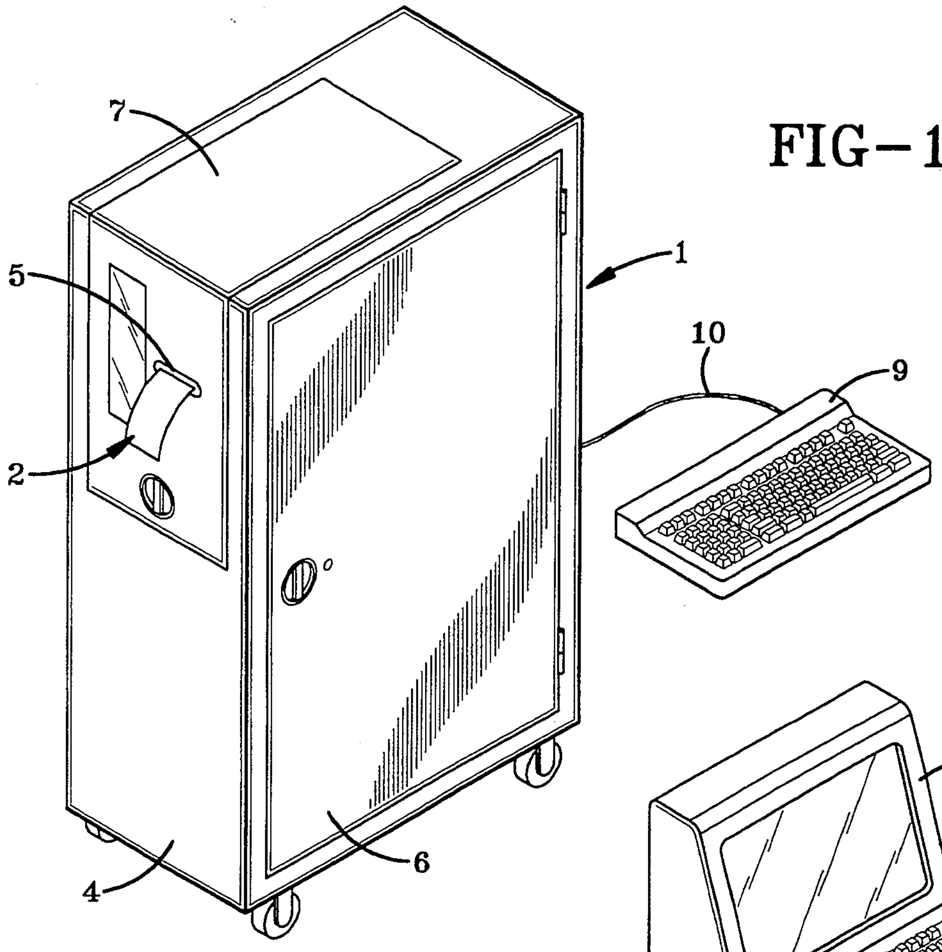
FIG. 1 is a diagrammatic perspective view of the form dispensing housing of the present dispensing system.
Figure 2:
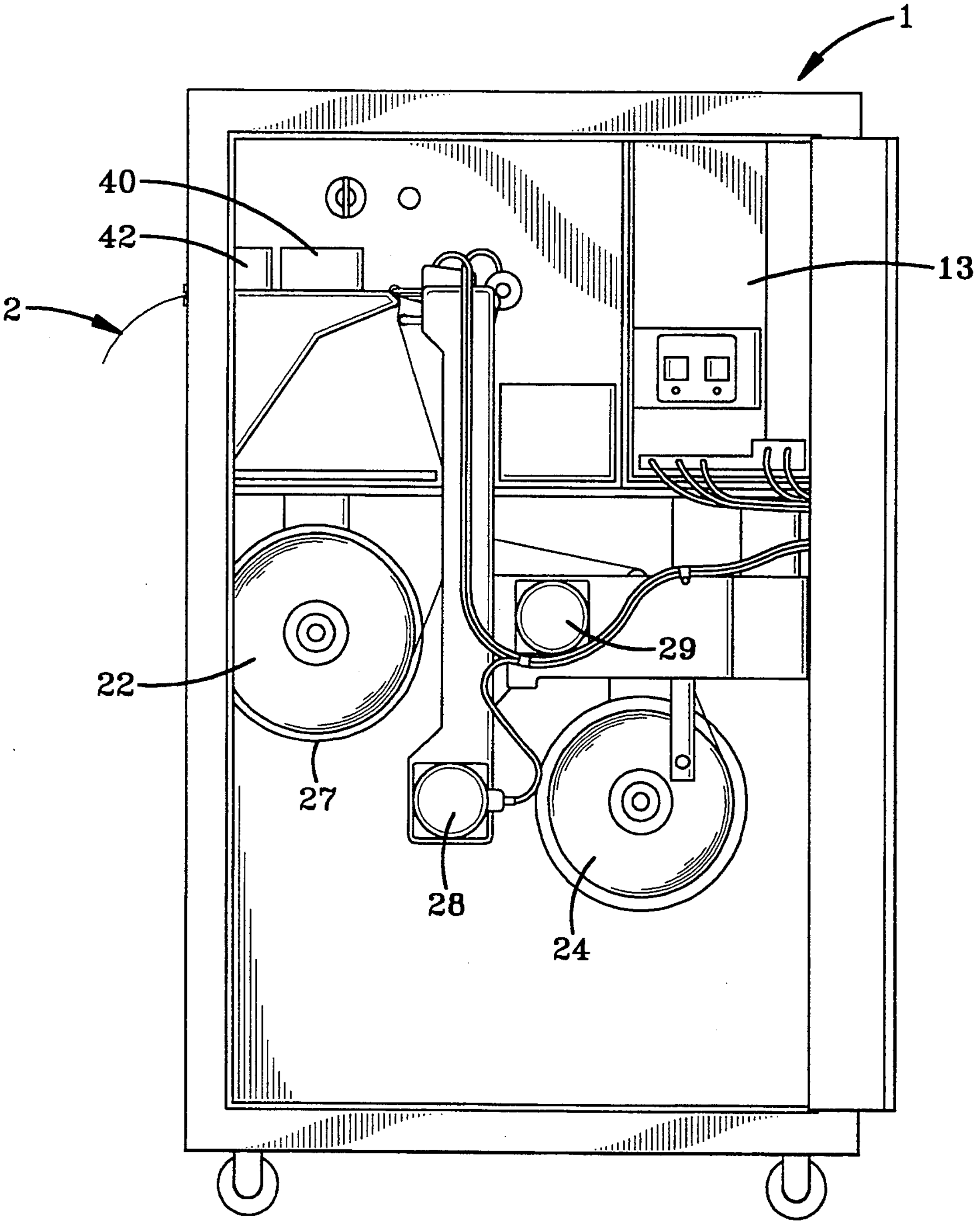
FIG. 2 is a diagrammatic side elevational view of the housing of FIG. 1 with the door in open position showing some of the internal components thereof.
Figure 3:
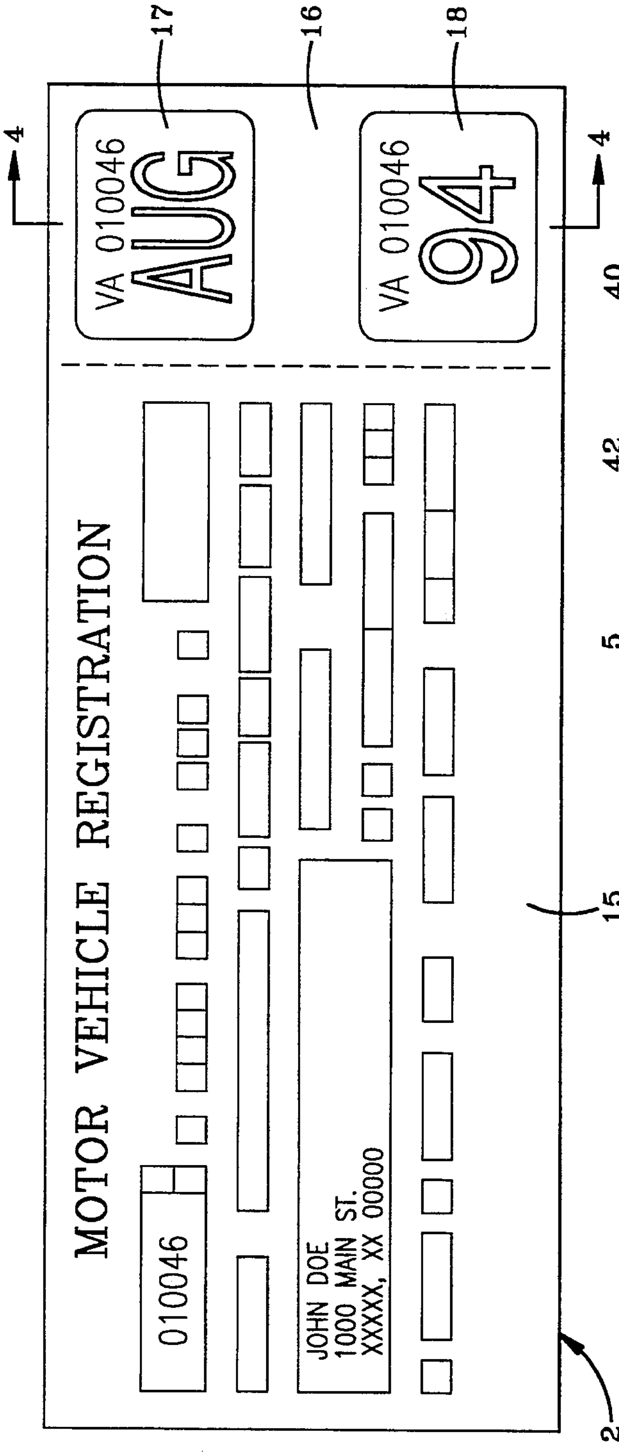
FIG. 3 is a top plan view of a printed form dispensed from the housing of FIGS. 1 and 2.

FIGS. 1 and 2 shows a machine indicated generally at 1, for automatically dispensing a printed form in accordance with the present invention, one type of form being shown particularly in FIG. 3 and indicated generally at 2. The machine and system illustrated in the drawings and discussed below is particularly intended for use in renewing automobile registrations but it will be understood that it is capable of dispensing other documents, either directly upon the instructions of an operator of a Government agency or appropriate officer, or upon the payment of the appropriate fee, such as for drivers license extensions, hunting and fishing licenses, permits, voter registrations, etc.

Machine 1 comprises an outer housing or cabinet 4 which includes a form dispensing slot 5 in one end thereof. A main door 6 and an auxiliary door 7 preferably are provided for access into the interior of housing 4 for the maintenance and repair of the components contained therein, and for the placing of the blank stock materials therein as described below.

Figure 1A:
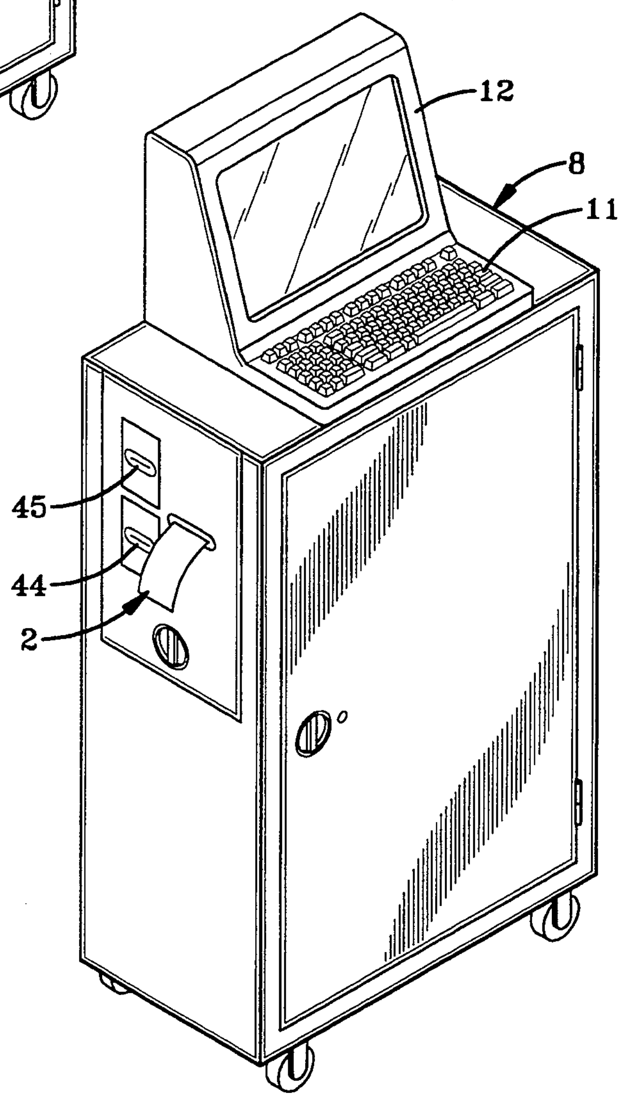
FIG. 1A is a diagrammatic perspective view similar to FIG. 1 showing the housing when used as a remote terminal.

Entry means for allowing an operator to enter commands and information for operating the form dispensing system may consist of a usual keyboard 9 which may be connected to the appropriate control means within housing 4 by a supply line 10, or may be formed as part of the housing when used as a remote terminal 8 as shown in FIG. 1A. The customer interface may also consist of a video display unit or CRT 12 (not shown for housing 4 in FIG. 1) to assist the operator, and when used as a remote terminal will be formed as a part of housing 4. The system is controlled by a computer 13 which may be mounted in housing 4 as shown in FIG. 2, which is linked to various peripheral devices. For many applications, computer 13 will be linked to a remote database containing stored records for various types of transactions to be covered by the form dispensing system. For example, if the system is arranged to perform automobile and license registrations and/or renewals, computer 13 will be linked to a Government database such as the Department of Motor Vehicles computer containing stored information on all vehicles registered including serial numbers, ownership information, license renewal dates, etc.

Computer 13 will also be linked to the various operator interface devices including CRT display 12 and keyboard 11 when used as a remote terminal or to keyboard 9 when used by an operator in a Government office or the like. The particular operation of the equipment and the communications therefor is similar to that of the type described in U.S. Pat. Nos. 4,970,655 and 4,567,359, the contents of which are incorporated herein by reference, and are therefore not disclosed in greater detail. The information entered by an operator will usually be sent to a remote database for verification and for subsequent authorization. Should the inputted information not be correct, the appropriate signals are supplied to computer 13 for cancelling the transaction or for notifying the operator that the submitted information is incorrect.

Figure 4:
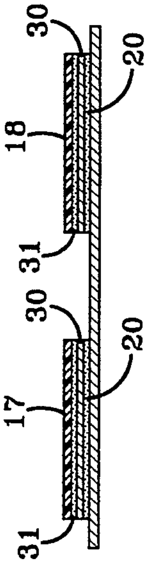
FIG. 4 is a fragmentary sectional view taken on line 4—4, FIG. 3.

One type of form for which form dispensing system is intended to be used is indicated generally at 2, and is shown in FIGS. 3 and 4. Form 2 illustrates an automobile registration form which includes a major section 15 along with a sticker bearing portion 16 containing one or more stickers or license tag decals 17 and 18 removably mounted thereon by an adhesive 20 as shown in FIG. 4, for subsequent removal by the vehicle owner for placement onto the license plate. One of the blank stickers may be printed with the year of expiry of the registration and the other blank sticker printed with the month of expiry, with one or both of the stickers containing an identification code or serial number which matches the code on section 15 of the registration certificate, and matches that contained in the vehicle registration database.

It is stickers 17 and 18 which contain the serial numbers and renewal year and months for vehicles which are valuable and are susceptible to theft, which is eliminated by the printing and dispensing system of the invention.

In accordance with one of the main feature of the invention best illustrated in FIGS. 2, and 6–8, a blank roll of paper stock material indicated at 22, is rotatably mounted within housing 4 by a supply reel 27. A pair of rolls 24 and 25 each containing a length of carrier web 26 and a plurality of stickers 17 and 18 releasably adhered thereto in a spaced relationship, are also rotatably mounted within the housing on associated supply reels, each being controlled by a pair of drive motors 28 and 29. Carrier web 26 will have a coating of a usual release material for releasably securing the stickers thereon by a release adhesive. Each sticker (FIG. 4) will also have a backing sheet 30 on which is releasably secured a sticker 17 or 18 by another adhesive 31. Backing sheets 30 are secured to webs 26 by pressure sensitive adhesive 20, which adhesive subsequently secures the stickers and backing sheets onto section 16 of form 2.

Figure 6:
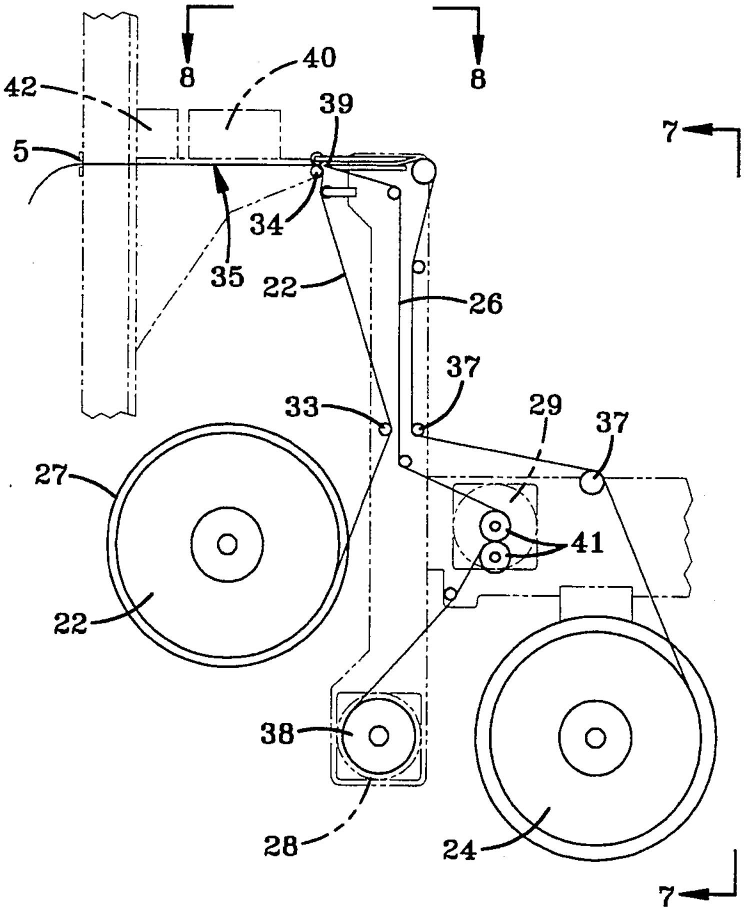
FIG. 6 is a generally diagrammatic side view showing the blank form supply rolls and path of travel through the housing of FIGS. 1 and 2.
Figure 7:
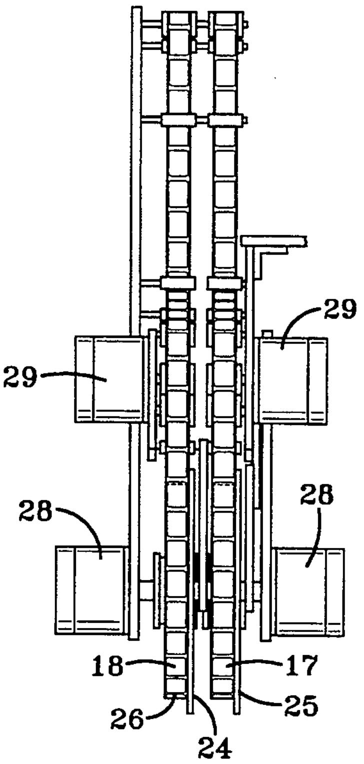
FIG. 7 is a view looking in the direction of arrows 7—7, FIG. 6.
Figure 8:
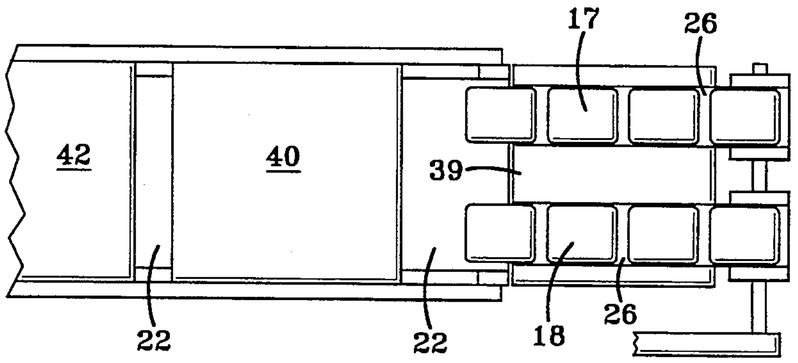
FIG. 8 is an enlarged diagrammatic view showing a portion of the blank form paper stock with two blank stickers placed thereon downstream of the printer, looking in the direction of line 8—8, FIG. 6.

Blank stock material 22 as shown in FIG. 6, extends around rolls 33 and 34 and then into a transport mechanism 35 for subsequent discharge through dispensing slot 5. Stickers 17 and 18 are carried by their respective carrier webs 26 about a plurality of rolls 37, with the webs being subsequently wound about waste rewinder reels 38 which are power driven by motors 28. Two pairs of pinch rolls 41 are driven by motors 29 for advancing only one, both or neither of the webs and attached stickers toward the discharge slot, depending upon the particular transaction being performed in response to the appropriate commands received from computer 13. The carrier webs and the releasably mounted stickers are passed over a peel plate 39, an end of which is immediately adjacent to the path of movement of blank roll stock material 22. Peel plate 39 automatically strips one or both of the stickers from the carrier webs where they are applied onto the upper surface of stock material 22 and retained thereon by adhesive 20. The blank stock material containing the blank sticker or stickers is then moved beneath a printing unit 40, which upon receiving its command from the computer will print the desired information on form section 15 and on stickers 17 and 18. The information printed is dependent upon the information which had been previously inputted into the computer by an operator through keyboards 9 or 11.

In accordance with another of the features of the invention, printer unit 40 is a thermal printer which thermally applies the information onto section 15 and stickers 17 and 18 of form 2. This information preferably is printed "on the fly", that is, the stock material is moving towards discharge slot 5 when the printing is applied. One type of printer for use in the dispensing system of the invention is sold by Zebra Technologies Corporation of Vernon Hills, Ill. and is identified as a Zebra 90A 32 Byte microprocessor. It has been found that the thermal application of the printed indicia especially onto the stickers, enables the stickers to pass the required test for durability and chemical attack which is required for such vehicle registration stickers or decals, which is difficult to achieve by the use of a standard impact printer. Stickers 17 and 18 when used as license plate decals are formed of reflective material preferably having glass beads as a component thereof to provide the reflective feature.

A cutter unit 42 is located immediately downstream of printing unit 40 or may be incorporated as an integral part of printer 40, adjacent dispense slot 5. Immediately after the printing operation has taken place, cutter 42 cuts the strip of stock material to form the desired length of form 2 for subsequent discharge from dispense slot 5. Cutter 42 also preferably performs its cutting operation "on the fly" as does printer 40. Stock material 22 is unwound from supply reel 27 and moved about rolls 33 and 34 and through printer 40 and cutter 41 by power driven pinch rolls or a similar mechanism contained in printer 40. Thus upon receiving the appropriate commands from computer 13 stock material 22 will advance through printer 40 and cutter 41, which cuts the desired length of material from the strip of stock material 22. Again the length of form 2 cut from strip 22 depends upon the particular form being printed.

FIG. 1A shows another embodiment in which the automatic dispensing system is used as a remote terminal 8 which as described above, will be provided with a keyboard 11 and CRT display 12 which will provide instructions to the customer or operator for inputting the necessary information through keyboard 11. After being notified of the amount of the required fee, the customer can pay this amount through a credit card receiving slot 44 or through other types of money receiving receptacles well known in the art. After the transaction has been completed, the license renewal certificate or other requested printed form 2, is discharged through slot 5, with a receipt for the payment, or various other information being discharged through an output slot 45. The various types of fee collecting devices and receipt dispensers are fully described in U.S. Pat. No. 4,970,655. When used as a remote terminal, the system is linked to one or more remote computers or databases which contain stored information on various types of transactions which can be performed by the remote terminal.

Figure 5:
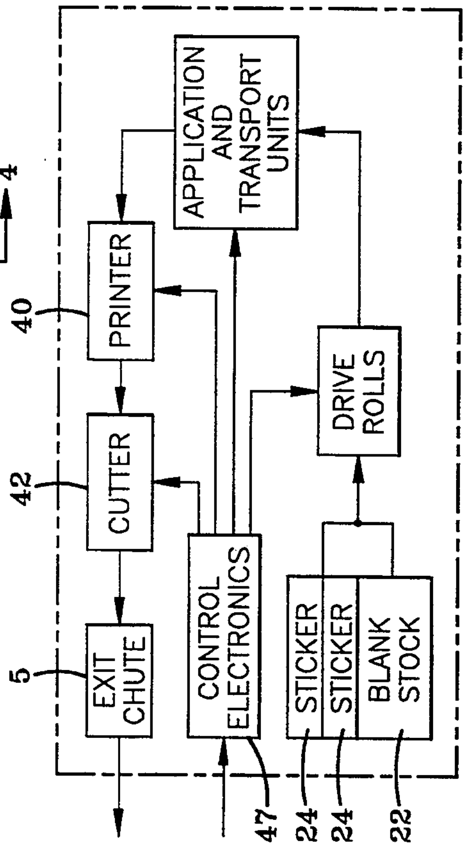
FIG. 5 is a block diagram showing parts of the dispensing unit.

FIG. 5 illustrates the flow diagram showing the steps in operation of the automatic form dispensing system of the invention described above. It is understood that the specific software programming for performing these steps is well within the scope of one skilled in the art and the program will be designed for various functions such as the printing and subsequent dispensing of drivers license extensions, hunting or fishing licenses, payment of taxes and parking tickets, payment of utility bills, ordering airline tickets, theater tickets, or the like. The control electronics indicated at 47, communicates with the various drive roll motors for moving the stickers and blank stock to the printer and cutter which are subsequently controlled by the control electronics, prior to printed form 2 being discharged through the exit chute.

Thus, as indicated above, one of the critical features of the invention is the ability of various types of forms to be printed with both fixed and variable data, and then dispensed, and in particular vehicle registration and license renewal forms in which the stickers or decals and forms are completely blank and free of any confidential and sensitive information when stored in the housing, which heretofore was subject to theft and fraud. The stickers are placed on a blank strip of stock material, afterwhich the critical information which has just been inputted into the computer, is then printed on the blank stock and on one or more of the stickers, afterwhich the form containing the stickers are then cut and dispensed. Thus, even if unauthorized personnel or fraudulent personnel has access to the interior of the housing, there is no danger of theft or fraud since only blank form stock material and blank stickers are contained within the housing, with the critical information being contained in a remote protected database. It is also readily understood that stickers 17 and 18 could be other types of validation stickers rather than license plate decals without affecting the concept of the invention. Also, the particular information printed in portion 15 could be for various subject matters as previously stated, and could even contain graphics if previously programmed into the computer and control circuitry therefore.

Accordingly, the improved form dispensing system is simplified, provides an effective, safe, inexpensive, and efficient system and devices which achieve all the enumerated objectives, provides for eliminating difficulties encountered with prior systems and devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved form dispensing system is constructed and used, the characteristics of the construction, and the advantageous, new and useful results obtained; the new and useful structures, devices, elements, arrangements, parts and combinations, and method steps are set forth in the appended claims.

We claim:

1. An automatic form dispensing system including:

a housing;

entry means for allowing an operator entry of commands and information;

at least two stock supply means in the housing for providing a supply of blank stock, each having first and second sides, for receiving information specific to a particular transaction on the first sides, and with one of said blank stock supplies having a pressure-sensitive adhesive on the second side thereof;

application means for releasably applying at least one of the pressure-sensitive blank stocks onto another of the blank stocks to provide a combined form;

printer means for printing information on the first sides of both the blank stocks which provides the combined form;

transport means for transporting the blank stocks from the supply means toward the printer means;

dispensing means for dispensing the printed combined form from the housing to an operator; and control means for controlling operation of the entry means, transport means, printer means and dispensing means according to a stored program of instructions.

2. The system defined in claim 1 including interface means for connecting said control means to a remote database containing stored information for subsequent printing on both of the blank stocks by the printer means.

3. The system defined in claim 2 in which said control means further includes means for communicating with said remote database to obtain from said database information specific to the particular transaction, means for comparing said information entered by an operator through the entry means with corresponding information on that transaction received from said database, means for authorizing the transaction if the information matches and for canceling the transaction if it does not match.

4. The system defined in claim 2 in which said control means further includes means for qualifying and performing a vehicle registration renewal and for dispensing a renewed registration form, said printer means printing all information for the specific vehicle registration involved in each transaction on the one side of both blank stocks.

5. The system defined in claim 1 in which the control means includes program instructions for performing different types of transactions including the printing of varying information on the blank stocks.

6. The system defined in claim 1 in which the printer means includes a thermal printer for thermally printing the information on one side of both of the blank stocks.

7. The system defined in claim 1 in which the stock supply means includes three supplies of blank stocks, two of said blank stocks comprising stickers mounted by pressure-sensitive adhesive in a spaced relationship along a strip of carrier web; and in which the third supply is a roll containing a length of blank paper stock.

8. The system defined in claim 7 in which the dispensing means includes a cutter for cutting the paper stock into a predetermined length form after the information is printed on said paper stock and on a pair of stickers, one from each supply, and after said stickers have been applied on said paper stock.

9. The system defined in claim 7 in which the transport means includes power driven drive roll means operatively engaged with the carrier webs for moving the webs and stickers toward the printer means.

10. The system defined in claim 9 in which the application means further includes a peel plate for automatically removing the stickers from the carrier web and applying them onto the length of blank paper stock upstream of the printer means.

11. The system defined in claim 2 in which the interface means includes a display means for displaying information and instructions to an operator, and fee collection means for collecting fees from an operator; and in which the control means further includes means for comparing information entered by an operator with corresponding information on that transaction received from the remote database, means for authorizing the transaction if the information matches and for canceling the transaction if it does not match, means for determining the fee associated with each authorized transaction, means for displaying the fee information to an operator, and means for detecting payment of the appropriate fee.

12. The system defined in claim 1 including display means for displaying information and instructions to an operator.

13. The system defined in claim 1 in which the said one blank stock having the pressure-sensitive adhesive on the second side thereof is formed of a reflective material.

14. The system defined in claim 1 in which the printer means includes means for controlling the movement of one of the stock supply means.

15. A method for dispensing forms to an operator of a terminal including the steps of:

a) providing a form dispensing assembly;

b) providing a roll of blank form stock material within the terminal;

c) providing a first roll of a carrier web containing a plurality of blank stickers releasably adhered to the web by an adhesive;

d) collecting all information required from an operator for a specific transaction;

e) communicating with a database containing stored information concerning the specific transaction;

f) controlling a form dispensing assembly in response to information collected from an operator including:

i) removing at least one of the stickers from the carrier web and applying it on the blank form stock;

ii) printing information specific to a specific transaction on a portion of the blank form stock and on said blank sticker;

iii) cutting off a length of said blank form stock containing the printed information and applied sticker from the roll of blank stock to provide the desired printed form; and iv) dispensing the printed form from the terminal.

16. The method defined in claim 15 including the steps of providing a second roll of carrier web containing a plurality of blank stickers;

removing one of the stickers from said second carrier web; and applying said sticker on the blank form stock generally simultaneously with the application of the sticker from the first roll onto the blank form stock.

17. The method defined in claim 15 including thermally applying the information on the blank form and on the blank sticker during the printing step.

18. The method defined in claim 17 including the steps of unwinding the roll of blank form stock and moving said stock past a printer which performs the printing step; and maintaining said movement of the stock during the printing step.

19. The method defined in claim 18 including performing the cutting step as the stock is moving toward a dispensing slot.

20. The method defined in claim 15 including the step of displaying fee information to an operator; detecting payment of the required fee by the operator; and controlling the form dispensing assembly in response to payment of the fee.

* * * * *